United States Patent [19]

Koyama et al.

[11] Patent Number: 4,562,488
[45] Date of Patent: Dec. 31, 1985

[54] DEVICE FOR REPRODUCED SOUND PITCH MODIFICATION IN A TAPE PLAYER

[75] Inventors: Reikichi Koyama; Kikuo Usugi, both of Tokyo, Japan

[73] Assignee: Clarion Co., Ltd., Tokyo, Japan

[21] Appl. No.: 509,176

[22] Filed: Jun. 28, 1983

[30] Foreign Application Priority Data

Jun. 28, 1982 [JP] Japan .............................. 57-95787[U]

[51] Int. Cl.$^4$ .............................................. G11B 5/00
[52] U.S. Cl. ......................................... 360/8; 360/32
[58] Field of Search ......................... 360/8, 32, 69, 61

[56] References Cited

U.S. PATENT DOCUMENTS 4,301,480 11/1981 Kitamura ................................. 360/8
4,365,115 12/1982 Nagata et al. ........................... 360/8

*Primary Examiner*—Vincent P. Canney
*Attorney, Agent, or Firm*—Stephen R. Arnold; Russell E. Hattis

[57] ABSTRACT

A pitch modification system for signals received from a tape player converts analog signals received from the player to binary digital form and stores them in sequential addresses in a memory unit at a rate set by a first clock. Output signals are produced by sequentially reading the stored information at a different rate as set by the frequency of a second clock, the ratio between the two clock frequencies causing the desired change in pitch with respect to the original signal. The output signal is converted from digital binary representation to an analog signal by a D/A converter. A detecting means is employed to detect no-signal conditions and generates an automatic reset signal which equalizes the two clock frequencies to restore the system to a zero-shift condition attendant to the appearance of silent passages on the tape.

13 Claims, 8 Drawing Figures

DEVICE FOR REPRODUCED SOUND PITCH MODIFICATION IN A TAPE PLAYER

BACKGROUND OF THE INVENTION

This invention relates to a device to change the pitch (play speed) of reproduced sound or music from a tape player and particularly for a tape player used to give a singer background music and mix the signer's voice with the background music.

A conventional pitch modifying device in a background music tape player includes a key to change the tape drive speed so that the user may select a desired pitch of reproduced music by changing the tape drive speed by operation of the key. Such a conventional device, however, once the changeover key is operated, has the property that the tape speed changeover rate, namely the pitch changeover rate, remains as it is. So, if the tape player is used by many persons, the changeover rate selected by a former user remains for a later user, and the later user has to readjust the changeover key.

Another conventional pitch modifying device is capable of changing merely the reproduced sound pitch without changing the tape drive speed. In such a device, also, the once selected pitch changeover rate remains as it is, and the device still poses the same problem.

OBJECT OF THE INVENTION

It is therefore an object of the invention to provide a reproduced sound pitch modifying device capable of automatically recovering a standard pitch when a reproduction at a modified pitch is finished.

SUMMARY OF THE INVENTION

According to a feature of the invention a pitch modification device for tape players features analog to digital conversion means for converting signals from the tape player into digital form and entering these digital signals as they are received into a memory means, contents of the memory means being subsequently read out and passed through a digital-to-analog conversion means and passed therefrom to an audio reproduction output means for reproducing the analog signals in audio form. Pitch shifting is secured by means of user-operated control means capable of controllingly setting the read-out frequency from the memory at various values equal to, less than, or greater than the read-in frequency, a zero-shift condition being automatically restored by means of a reset signal detector which detects signalless zones in the signals from the tape so as to restore the system to a zero-shift condition at the end of each passage.

According to specific features of the invention the frequency shift control means includes a pair of frequency dividers performing frequency division from a master clock oscillator to provide the writing clock and reading clock signals respectively, there further being provided a read-only memory storing the desired frequency division ratios and outputting a controlling chosen ratio to control the division ratio of the memory read frequency divider to preset values stored therein. Control of the chosen ratio is established most preferably by a keyboard-actuated encoder selectively accessing a chosen address of the read-only memory to cause the value stored therein to control the frequency division ratio. According to further related features of the invention the continuity of the output digital signals to the digital analog converter is insured by employing a pair of latched circuits for latchingly storing contiguous groups of digital signals and adding them up together appropriately by means of fade circuits connected thereto.

DETAILED DESCRIPTION OF THE PREFERRED EMBODIMENT

Figure 1:
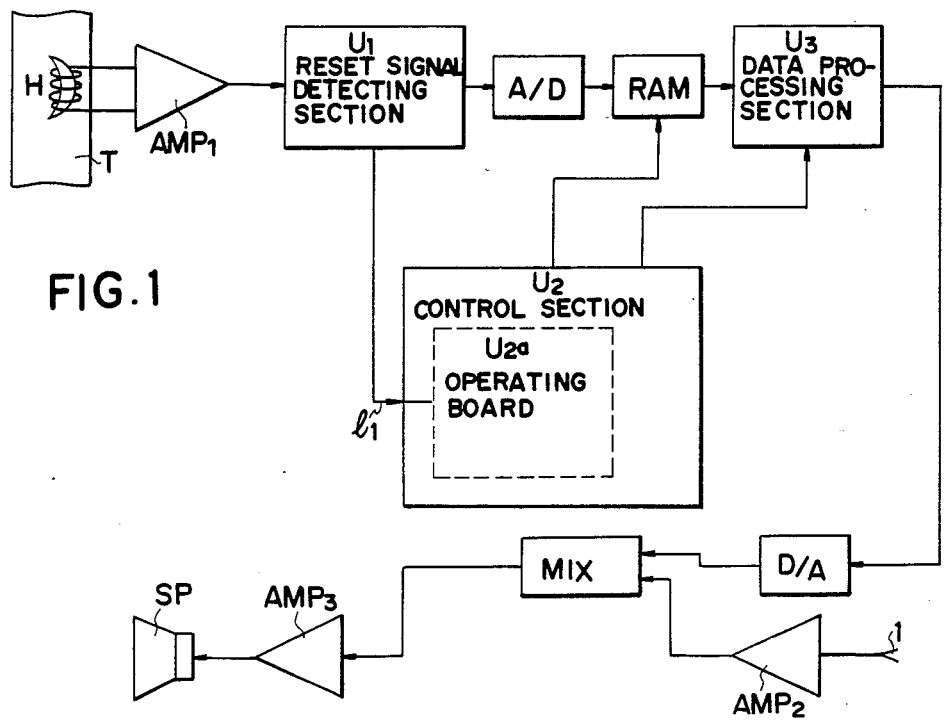
FIG. 1 is a block diagram showing an embodiment of the present invention employed in a tape player to provide a singer with a background music.

The invention will now be described in detail by way of a preferred embodiment referring to the drawings.

FIG. 1 shows a fundamental construction of an embodiment of the invention which is employed in a tape player to provide background music to a singer and which is arranged to mix reproduction signals from a magnetic tape with voice input signals from a microphone. In FIG. 1, reference letter H designates a tape reproduction head, $AMP_1$ is a head amplifier, and $U_1$ is a reset signal detector. The reset signal detector detects, for example, a signalless zone between or at the ends of recorded background music on a tape T, and sends a reset signal to a control section which will be described later. Reference letters A/D designate an A/D (analog-to-digital) converter, and RAM is a random-access memory (hereinafter called "RAM"). The A/D converter converts audio reproduction signals from the head H into digital signals and the RAM stores them. A control section designated by $U_2$ supplies a write signal to control write-down frequency for the RAM and a read signal to control the read-out frequency for the same. The pitch of the reproduced music is determined by the frequency ratio $f_R/f_W$ ($f_R$ is the read-out frequency and $f_W$ is the write-in frequency). In this case, for example, the write-in frequency $f_W$ is fixed so that the pitch may be modified by varying the read-out frequency. The control section $U_2$ has an operating board $U_{2a}$ associated therewith, and other elements to enable changing the read-out frequency $f_R$. Reference numeral $U_3$ designates a data processing section which will be described later. A D/A (digital-to-analog) converter converts the read-out digital signal supplied from the RAM via the data processing section $U_3$ into a reproduced analog signal. Reference letters MIX designate a mixing circuit, numeral 1 is a microphone input terminal, $AMP_2$ is a microphone amplifier, $AMP_3$ is a power amplifier, and SP is a loudspeaker. The power amplifier $AMP_3$ and the loudspeaker SP make up a reproduction sound output means to output reproduction analog signals.

The control section $U_2$, the data processing section $U_3$ and other relevant constituents which are outlined in FIG. 1 will be described in detail referring to FIG. 2.

The control section $U_2$ involves first and second clock frequency dividers $D_1$ and $D_2$ to which a master clock oscillator CL is commonly connected to generate a master clock signal. The first clock frequency divider $D_1$ performs frequency division of the master clock signal by a given division ratio and generates a write clock signal corresponding to the write-in signal. The second clock frequency divider $D_2$ also performs frequency division of the master clock signal and generates a read-out clock signal corresponding to the read-out signal. The frequency division ratio of the second divider $D_2$ is variable so that the read-out frequency $f_R$ may be changed. The control section $U_2$ also involves the operating board $U_{2a}$ and a read-only memory ROM (hereinafter called "ROM") to control the frequency division ratio for the second clock frequency divider $D_2$. The operating board $U_{2a}$ carries operating buttons $S_1$ and $S_n$ for selection of frequency division ratios for the second clock frequency divider $D_2$. The operating board further carries an encoder E. When one of the operating buttons $S_1$ to $S_n$ is depressed, the encoder E sends an encode signal corresponding to the depressed button and latches the succeeding signals thereafter until another button is depressed. The ROM involves plural addresses storing different frequency division ratio data, respectively. When the ROM receives an encode signal from the encoder E, a corresponding one of the data is supplied to the second clock frequency divider $D_2$ to control the same. An address O of the ROM stores a frequency division ratio data which equalizes the frequency division ratio of the second clock frequency divider $D_2$ to that of the first clock frequency divider $D_1$. The encoder E is connected to a reset signal detector $U_1$ by a reset signal line $1_1$. When the encoder E is supplied with a reset signal, it is released from the latched state and supplies a signal to the ROM to reset it at the address O. Output lines from the first and second frequency dividers $D_1$ and $D_2$ are connected to a control circuit C. First and second read signal lines $1_2$ and $1_3$ derive from the control circuit C and are connected to the RAM via two-input first OR circuit $OR_1$. A write signal line $1_4$ also derives from the control circuit C and is connected to the RAM. A bus $1_5$ branches off the line $1_4$ and is connected to a bus buffer B. The first and second read signal lines $1_2$, $1_3$ and the write signal line $1_4$ are also connected to three-input second OR circuit $OR_2$. The output of the second OR circuit $OR_2$ is connected to the RAM to supply it with a memory enable signal.

The data processing section $U_3$ generally functions to process digital signals (digital data) picked up from the RAM so as not to produce discontinuities in the resulting reproduced sound, and to send the resulting output to the D/A converter. In this case, a cross-fade data processing system is employed. First and second latch circuits $L_1$, $L_2$ and first and second fade circuits $F_1$, $F_2$ are associated with and first and second read signal lines $1_2$ and $1_3$, respectively, and are connected to an adder ADD, which is in turn connected to the D/A converter. The first and second fade circuits $F_1$ and $F_2$ are connected to the control circuit C by first and second fade control signal lines $1_6$ and $1_7$, while the first and second latch circuits $L_1$ and $L_2$ are provided with the first and second read signals which function as latch control signals.

The operation of the device will now be described in detail referring to FIGS. 3A, 3B, 5A and 5B, too.

In the explanation hereinbelow, the pitch is normal when the read-out frequency $f_R$ is equal to the write-in frequency $f_W$, the pitch is high when the read-out frequency $f_R$ is higher than the write-in frequency $f_W$, and is low when the read-out frequency $f_R$ is lower than the write-in frequency $f_W$, respectively.

Figure 3A:
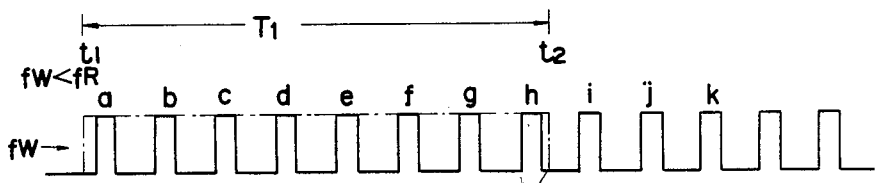
FIGS. 3A, 3B, 4A and 4B are time charts of digital signals in the operating processes of the same embodiment.
Figure 3B:
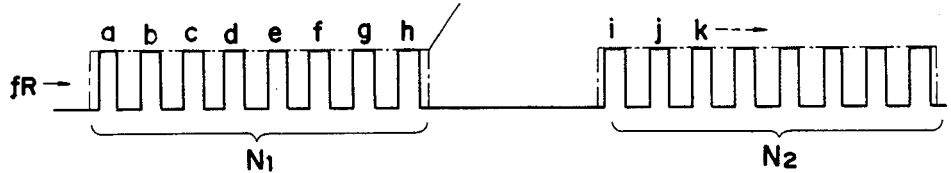
Figure 2:
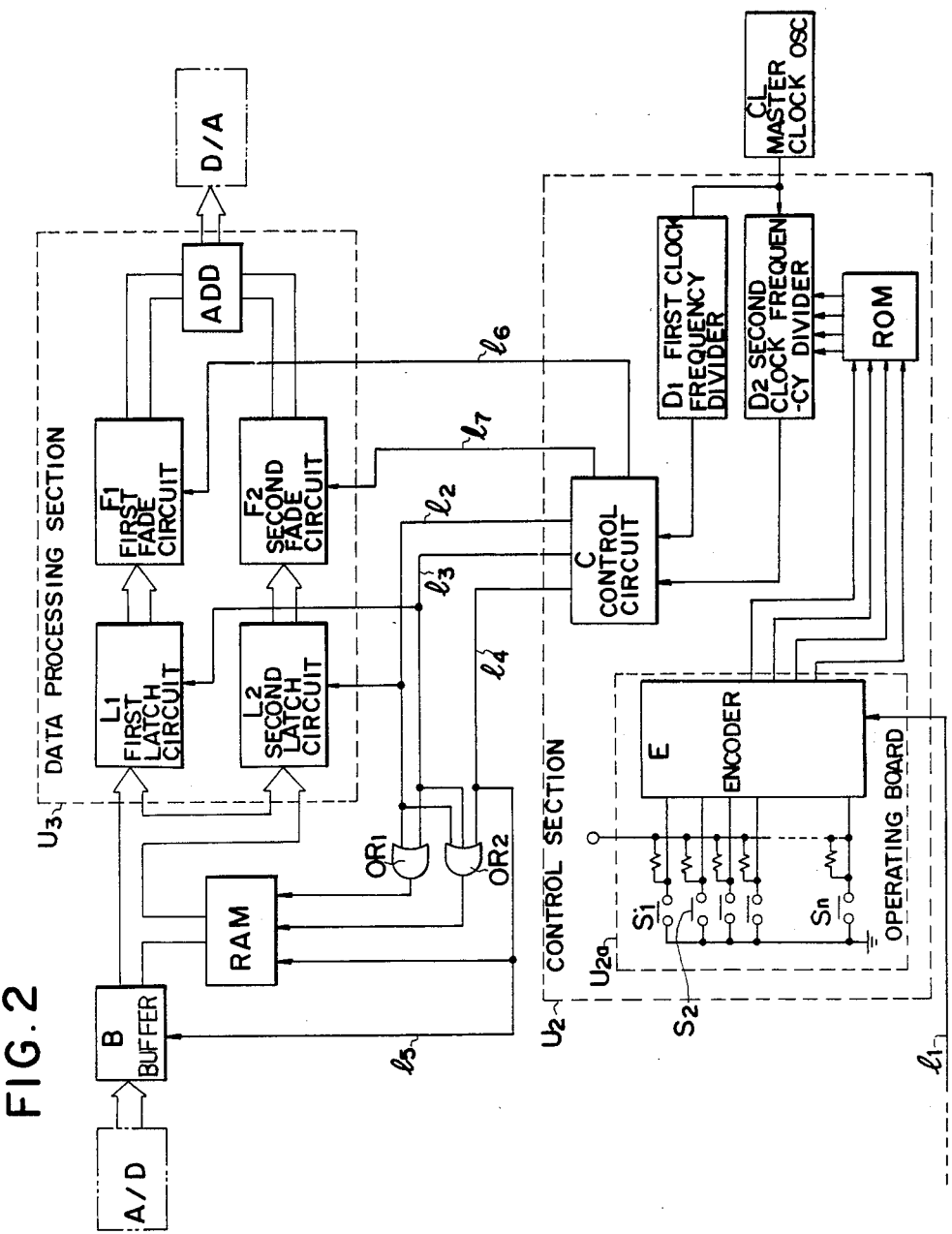
FIG. 2 is a block diagram showing in detail the control section, the data processing section and some relevant elements of FIG. 1.

Now assume that all the elements in FIGS. 1 and 2 are supplied with source power and are ready to operate, and that the write-in frequency $f_W$ is kept constant due to the frequency division by the first clock frequency divider $D_1$, while the read-out frequency $f_R$ is set to be $f_W < f_R$ by operation of a given operating button on the operating board $U_{2a}$. When the tape player starts, signals on a tape are reproduced by the head H and are converted into digital signals by the A/D converter. The digital signals are stored in the RAM at a predetermined rate governed by the frequency $f_W$. FIG. 3A shows a process wherein data a, b, c . . . consisting of the digital signals are stored in accordance with the time $t_1$, $t_2$ . . . at the write-in frequency $f_W$. In this data processing system employing the cross-fade method, the stored data a, b, c . . . are sequentially read out in every period $T_1$ by two read-out signals from the first and second read signal lines $1_2$ and $1_3$. A data group $N_1$ which is stored during one period $T_1$ is read out by the first read-out signal before the time $t_2$ comes up, as shown in FIG. 3B. So, in the remaining time of the period $T_1$, succeeding data i, j, k are read out. The data i, j, k belong to a data group $N_2$ to be read out by the second read-out signal and are read out two times. The data groups $N_1$ and $N_2$ which were read out at the different times are latched in the first and second latch circuits $L_1$ and $L_2$ by the latch control signals.

Figure 4A:
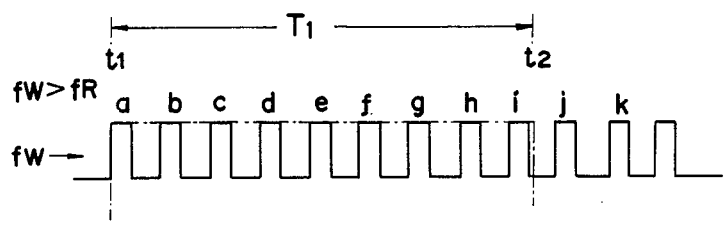
Figure 4B:
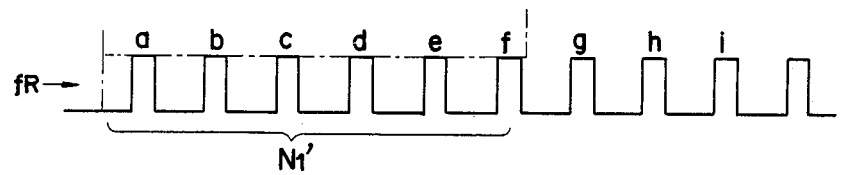

Assume now that the read-out frequency $f_R$ is set to be $f_W > f_R$. As shown in FIG. 4B, a data group $N_1'$ which is read out by the first read-out signal during the period $T_1$ involves less data a to f, for example, than the data a to i which are written during the same period $T_1$. The second read-out signal reads out a next data group starting from the data j, skipping the remaining data g to i. Thus, although the processes of the data writing and reading are temporally different, they are corrected every period $T_1$. Therefore, the data writing and reading appear to progress simultaneously as a whole.

Figure 5A:
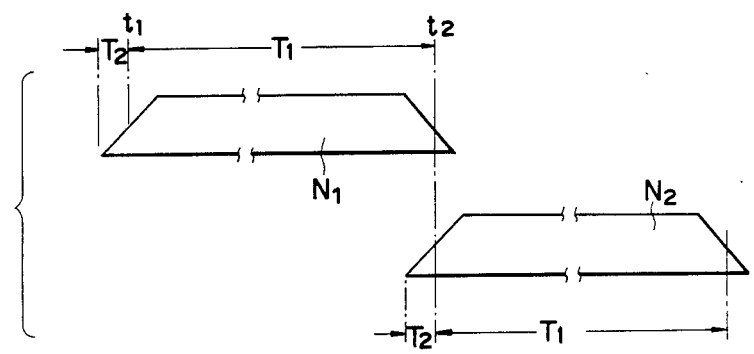
FIGS. 5A and 5B show diagramed waveforms for explanation of the operation of the data processing section.
Figure 5B:
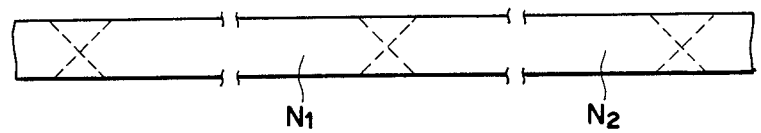

In any event when the read-out frequency $f_R$ is different from the write-in frequency $f_W$, if the data groups $N_1$, $N_2$ . . . which were read out by the first and second read-out signals are incorporated as they are, then the resulting reproduced sound will contain discontinuities. To amend this, the following treatment is taken in the data processing section $U_3$, etc. As shown in FIG. 5A, the former data group $N_1$ is read out by the first read-out signal earlier as much as $T_2$ than the time $t_1$, and similarly, the latter data group $N_2$ is read out by the second read-out signal earlier as much as $T_2$ than the time $t_2$. The former and latter ends of the respective data groups $N_1$ and $N_2$ are faded in or faded out by the first and second fade circuits $F_1$ and $F_2$. The fading operations last for the time $2T_2$. The data groups $N_1$ and $N_2$ as the result of the fading treatment are sequently added in the adder ADD and are shaped up into smooth and continuous digital signals are shown in FIG. 5B. The digital signals are then converted into analog signals by the D/A converter and the analog signals transmitted through the mixing circuit MIX and the power amplifier $AMP_3$ to the loudspeaker SP, and are thus reproduced into an audio sound. In this case, the resulting sound is reproduced at a high pitch or at a low pitch due to the control action of the control section $U_2$ which controls the read-out frequency $f_R$ to be $f_W 21 f_R$ or $f_W > f_R$.

When a desired reproduction is finished, the reset signal detecting section $U_1$ detects a signalless zone on the tape and sends a reset signal to the encoder E. Then, the encoder E which latched an encode signal corresponding to the chosen read-out frequency $f_R$ is released from its latched state, and applies a signal to reset the ROM at the address O. With this signal, the ROM is reset at the address O and adjusts the frequency division ratio of the second clock frequency divider $D_2$ to be same as that of the first clock frequency divider $D_1$, namely $f_W = f_R$, thereby resetting the tape player at the normal pitch.

As described in the above, the device according the present invention is arranged so that reproduction signals from the head are converted into digital signals so as to be once written down in the memory and to be there after reconverted to analog signals and be reproduced into an audio sound at a modified pitch in accordance with the ratio between a write-in frequency and a read-out frequency of the memory, and that the write-in and read-out frequencies are readjusted to be equal by a reset signal responsive to detection of a signalless zone on a tape so as to automatically reset the tape player at its original pitch. Therefore, particularly when the tape player is widely used by many persons, even if a former user sets the player at a different reproduction pitch, the next user can always get a reproduced sound at a normal pitch.

We claim:

1. A pitch modification device in a tape player which comprises:
    magnetic tape reproduction means for producing reproduction signals;
    reset signal detecting means for detecting a signalless zone on a magnetic tape among said reproduction signals from said reproduction means and for generating a reset signal responsive to said signalless zone;
    A/D conversion means for converting said reproduction signals from said reproduction means into digital signals;
    memory means for accepting digital signals from said A/D converter to be written therein and to be read out therefrom;
    user-operated control means for selecting from a progressive incremental range of values a fixed ratio between the write-in frequency $f_w$ and the read-out frequency $f_R$ of said memory means to make the read-out frequency equal to, greater than, or less than the write-in frequency, and connected to said reset signal detection means so as to supply said reset signal and for equalizing said frequencies in response to said reset signal;
    D/A conversion means for converting digital signals read out from said memory means into analog signals; and
    audio reproduction output means for reproducing said analog signals into audio signals.

2. The device of claim 1 wherein said memory means comprises binary random access memory means.

3. A device as set forth in claim 1 further comprising a data processing means interposed between said memory means and said D/A conversion means to ensure continuity of said digital signals.

4. The device of claim 3 wherein said memory means comprises binary random access memory means.

5. A device as set forth in claim 1 wherein said reproduction output means includes an audio signal input means, and a mixing means to mix said analog signals from said D/A conversion means with audio signals from said audio signal input means.

6. The device of claim 5 wherein said memory means comprises binary random access memory means.

7. A pitch modification device in a tape player which comprises:
    magnetic tape reproduction means for producing reproduction signals;
    reset signal detecting means for detecting a signalless zone on a magnetic tape among said reproduction signals from said reproduction means and for generating a reset signal responsive to said signalless zone;
    A/D conversion means for converting said reproduction signals from said reproduction means into digital signals;
    memory means for accepting digital signals from said A/D converter to be written therein and to be read out therefrom;
    control means for controlling the ratio between the write-in frequency $f_w$ and the read-out frequency $f_R$ of said memory means and for equalizing said frequencies in response to said reset signal;
    D/A conversion means for converting digital signals read out from said memory means into analog signals; and
    reproduction output means for reproducing said analog signals into audio signals, further comprising a data processing means interposed between said memory means and said D/A conversion means to ensure continuity of said digital signals, and wherein said data processing means includes;
    first and second latch circuits latching said digital signals;
    first and second fade circuits connected to said first and second latch circuits, rerspectively; and
    an adding circuit adding outputs from said first and second fade circuits and applying a resulting output to said D/A conversion means.

8. A device as set forth in claim 7 wherein said reproduction output means includes an audio signal input means, and a mixing means to mix said analog signals from said D/A conversion means with audio signals from said audio signal input means.

9. The device of claim 7 wherein said memory means comprises binary random access memory means.

10. A pitch modification device in a tape player which comprises:
    magnetic tape reproduction means for producing reproduction signals;
    reset signal detecting means for detecting a signalless zone on a magnetic tape among said reproduction signals from said reproduction means and for generating a reset signal responsive to said signalless zone;
    A/D conversion means for converting said reproduction signals from said reproduction means into digital signals;
    memory means for accepting digital signals from said A/D converter to be written therein and to be read out therefrom;
    control means for controlling the ratio between the write-in frequency $f_w$ and the read-out frequency $f_R$ of said memory means and for equalizing said frequencies in response to said reset signal;

D/A conversion means for converting digital signals read out from said memory means into analog signals; and reproduction output means for reproducing said analog signals into audio signals, wherein said control means includes;

a master clock oscillator;

a first frequency divider performing frequency division of a clock signal from said master clock oscillator and generating a write clock signal;

a second frequency divider performing frequency division of a clock signal from said oscillator and generating a read clock signal;

a read-only memory storing a plurality of frequency division ratios and controllingly outputting a chosen one of the ratios to control the division ratio of said second frequency divider;

an operating section generating a ratio command signal in response to a manual operation to select one of said frequency division ratios and commanding the reading out of a corresponding ratio from said read-only memory in response to said ratio command signal; and a control circuit applying said write and read clock signals from said first and second frequency dividers to said memory means.

11. A device as set forth in claim 10 further comprising a data processing means interposed between said memory means and said D/A conversion means to ensure continuity of said digital signals.

12. A device as set forth in claim 10 wherein said reproduction output means includes an audio signal input means, and a mixing means to mix said analog signals from said D/A conversion means with audio signals from said audio signal input means.

13. The device of claim 10 wherein said memory means comprises binary random access memory means.

* * * * *